US011870302B2

(12) United States Patent
Druant et al.

(10) Patent No.: US 11,870,302 B2
(45) Date of Patent: Jan. 9, 2024

(54) SYSTEMS AND METHODS FOR A SEGMENTED ELECTRIC MOTOR

(71) Applicant: Dana Automotive Systems Group, LLC, Maumee, OH (US)

(72) Inventors: Joachim Druant, Houthulst (BE); Steven Vanhee, Hooglede (BE)

(73) Assignee: DANA AUTOMOTIVE SYSTEMS GROUP, LLC, Maumee, OH (US)

(*) Notice: Subject to any disclaimer, the term of this patent is extended or adjusted under 35 U.S.C. 154(b) by 120 days.

(21) Appl. No.: 17/445,585

(22) Filed: Aug. 20, 2021

(65) Prior Publication Data
US 2023/0054487 A1    Feb. 23, 2023

(51) Int. Cl.
*H02K 1/00* (2006.01)
*H02K 1/14* (2006.01)
*H02K 21/12* (2006.01)
*H02K 16/00* (2006.01)
*H02P 25/18* (2006.01)

(52) U.S. Cl.
CPC ............. *H02K 1/148* (2013.01); *H02K 16/00* (2013.01); *H02K 21/12* (2013.01); *H02P 25/188* (2013.01)

(58) Field of Classification Search
CPC ...... H02K 16/00; H02K 21/12; H02P 25/188; H02P 31/00
See application file for complete search history.

(56) References Cited

U.S. PATENT DOCUMENTS

| | | |
|---|---|---|
| 6,894,455 B2 | 5/2005 | Cai et al. |
| 7,863,789 B2 | 1/2011 | Zepp et al. |
| 8,292,770 B2 | 10/2012 | Novikov |
| 9,248,732 B2 | 2/2016 | Honda |
| 9,621,099 B1 | 4/2017 | Namuduri et al. |
| 9,800,194 B2 | 10/2017 | Dajaku et al. |
| 9,812,981 B2 | 11/2017 | Ritchey et al. |
| 10,523,148 B2 | 12/2019 | Li et al. |
| 2010/0164422 A1 | 7/2010 | Shu et al. |
| 2014/0239876 A1 | 8/2014 | Tao et al. |
| 2016/0036308 A1* | 2/2016 | Bailey ................ H02K 16/04 310/91 |
| 2017/0047804 A1 | 2/2017 | Dajaku |

FOREIGN PATENT DOCUMENTS

| | | | |
|---|---|---|---|
| DE | 102014018317 A1 | 6/2015 | |
| JP | 5678550 B2 | 3/2015 | |

\* cited by examiner

*Primary Examiner* — Karen Masih
(74) *Attorney, Agent, or Firm* — McCoy Russell LLP

(57) ABSTRACT

Methods and systems are provided for operating an electric motor including multiple rotor and stator sections. In one example, a system may include the multiple rotor sections configured to be mechanically coupled and decoupled from each other concurrently with multiple stator sections configured to be electrically coupled and decoupled from each other, within certain regimes of operation of the electric motor.

9 Claims, 7 Drawing Sheets

SYSTEMS AND METHODS FOR A SEGMENTED ELECTRIC MOTOR

TECHNICAL FIELD

The present description relates generally to methods and systems for controlling an electric motor including multiple stator and rotor sections.

BACKGROUND AND SUMMARY

In automotive applications, an electric motor may be used for multiple purposes, including as a starter motor, an electric drive assist (e.g., propulsion boost) as well as pure electric drive, a generator providing electric power for onboard electric loads and charging battery banks, and as a re-generator acting to convert the kinetic energy of the vehicle to electric power for charging the battery bank during braking/deceleration of the vehicle. One type of electric motor that is currently used for electric drive in passenger electric vehicles is a permanent magnet motor, in particular an AC permanent magnet motor. An AC permanent magnetic motor is commonly sought for electric vehicles in recent years, due to synchronous response to an AC current (e.g. without slippage), in addition to reduced heat losses as compared to an AC induction motor. An AC permanent magnet motor may include a fixed stator with one or more phases of conductive windings contained therein, a voltage supply to the conductive windings within the stator, and a freely rotatable rotor with permanent magnets embedded therein. Rotation of the rotor may be generated through interaction between the permanent magnets embedded therein and rotating magnetic fields generated by the conductive windings within the stator, the latter of which may be generated through application of an AC voltage to the conductive windings of the stator. In particular, the embedded permanent magnets within the rotor may cause the rotor to rotate in order to align their own magnetic field with that of the rotating magnetic field generated by the conductive windings of the stator (magnetic torque), in addition to forces applied to the permanent magnets embedded within the rotor by the rotating magnetic field generated by the stator (reluctance torque). Application of an AC voltage may then serve to generate continuous rotational motion of the rotor, generating torque which may be converted into useful motion via an output shaft.

In an electric motor, a back EMF is generated in response to the changing magnetic flux through the rotor due to the rotation of the rotor, opposing the applied voltage to the conductive windings within the stator. In order to counteract back EMF, the controller may apply current to the three windings corresponding to the three phases of current in such a way as to reduce a portion the current contributing to the back EMF, via so-called field weakening currents.

However, the efficiency of the electric motor may be reduced at high speed, due to the large amount of power required to generate the field weakening currents. Attempts have been made to obtain constant power through reducing the back EMF during high speed operation of an electric motor. One approach for reducing back EMF without the extra power consumption associated with field weakening was given by Zepp et al. in U.S. Pat. No. 7,863,789. Therein, Zepp et al. introduce an electric motor for a hybrid vehicle in a parallel hybrid configuration, the electric motor including a stator and a rotor axially aligned with the stator, with the rotor contained in the stator envelope. The rotor may then be continuously magnetically decoupled from the stator via linearly shifting the rotor out of the stator envelope along the axis of rotation of the rotor to varying degrees. As the rotor is shifted out of the stator envelope, the "iron losses" induced in the stator due to the rotation of the permanent magnets in the motor may be reduced. The reduction of flux through the rotor may allow for increasing and/or maintaining a motor speed with a constant power input, with the tradeoff of reduced motor torque. A motor controller provides active control of rotor position as the vehicle transitions between motoring, generating and idle modes. This may be beneficial during constant speed operation, e.g. during highway operation, when a combustion engine is the main driver of the hybrid vehicle.

However, the inventors herein have recognized potential issues with such systems. As one example, while the approach of Zepp et al. may provide a method for selectively magnetically decoupling the stator from the rotor, during operation of the electric motor with voltage being supplied to the stator, current is supplied throughout the stator. Therefore, as the rotor is axially shifted out of the stator envelope to a particular extent, current is still being applied throughout the whole stator, generating unneeded current in the portion of the stator which does not overlap with the shifted rotor. In particular, the approach of Zepp et al. may not provide significant advantage in the case of applying field weakening currents.

In one example, the issues described above may be addressed by a system for an electric motor comprising: a plurality of rotor sections configured to be mechanically decoupled from one another, and a plurality of stator sections configured to be electrically decoupled from one another. In this way, the electric motor may be electrically and mechanically decoupled to varying degrees, in order to meet power and torque requirements of the electric motor operation, without requiring high field weakening currents during high speed operation of the electric motor.

As one example, the electric motor may include three motor sections, with a first motor section including a first rotor section and a first stator section, a second motor section including a second rotor section and a second stator section, and a third motor section including a third rotor section and a third stator section. The first rotor section, the second rotor section, and the third rotor section are all arranged coaxially and linearly spaced on a shaft, and the first stator section, the second stator section, and the third stator section, are linearly spaced in alignment with the respective rotor sections. Each of the three rotor sections and the three stator sections may be included within a shared housing. The rotor sections may be mechanically decoupled via clutches between the rotor sections, and the stator sections may be electrically decoupled via electrical switches, allowing for sequential switching off of individual stator sections. This may allow for full motor operation throughout the speed range of the electric motor, with respective stator and rotor sections being decoupled from the operating part of the electric motor during higher speed operation, in order to allow for high speed operation of the electric motor without high field weakening losses. Additionally, the number of active rotor and stator sections during motor operation may be adjusted in order to optimize efficiency of the electric motor operation, with sections of the motor decoupled from the active portion of the motor as speed of the electric motor, and other demands on the electric motor, increase.

In this way, by opportunistically utilizing one or more of the maximum available portions of the electromagnetically active part of the electric motor at different speeds, continuous operation of the electric motor may be achieved without sustaining high field weakening losses at high speed. In particular, the above approach may be efficient for operating at partial load, e.g. during constant speed operation such as during highway driving. The technical effect of the modular design of the electric motor is that an appropriate number of motor sections may be coupled based on operating conditions to be used as a single motor unit. Further, by including the switches and clutches, decoupling and recoupling of the motor sections is facilitated, allowing for continuous optimization of the performance of the electric motor.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
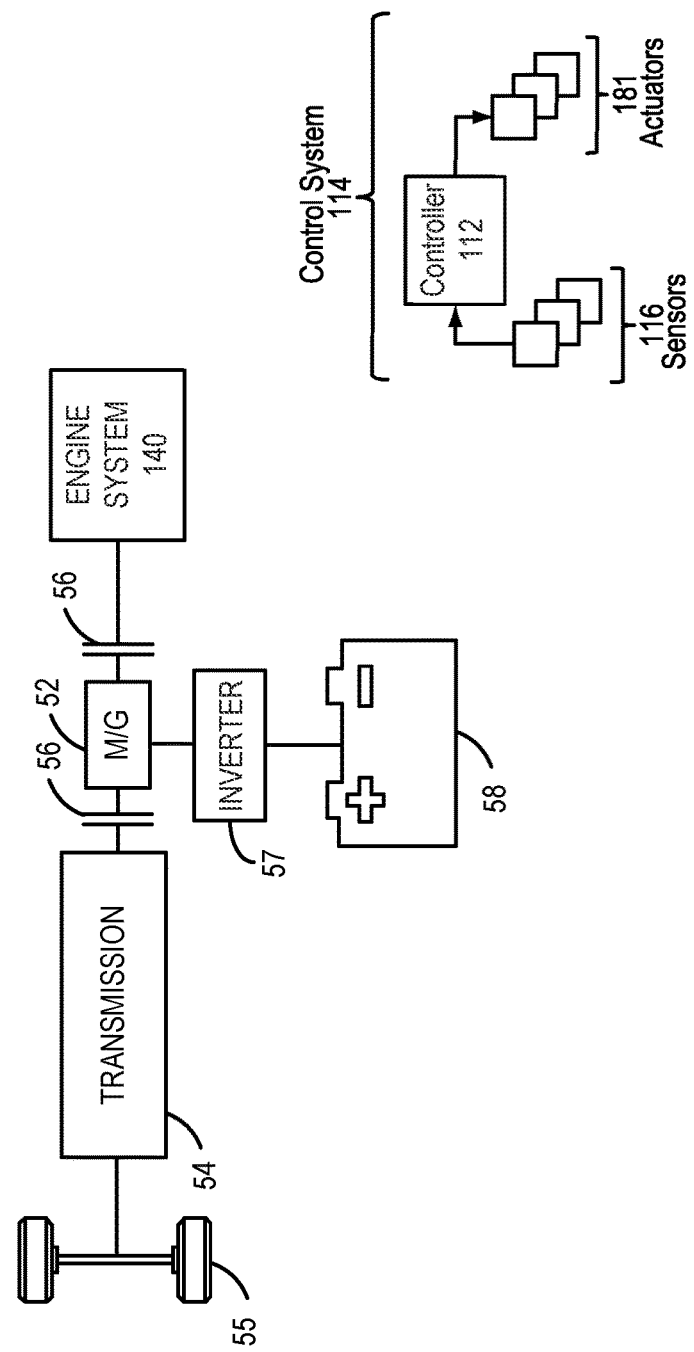
FIG. 1 shows a schematic of an example hybrid vehicle.
Figure 2:
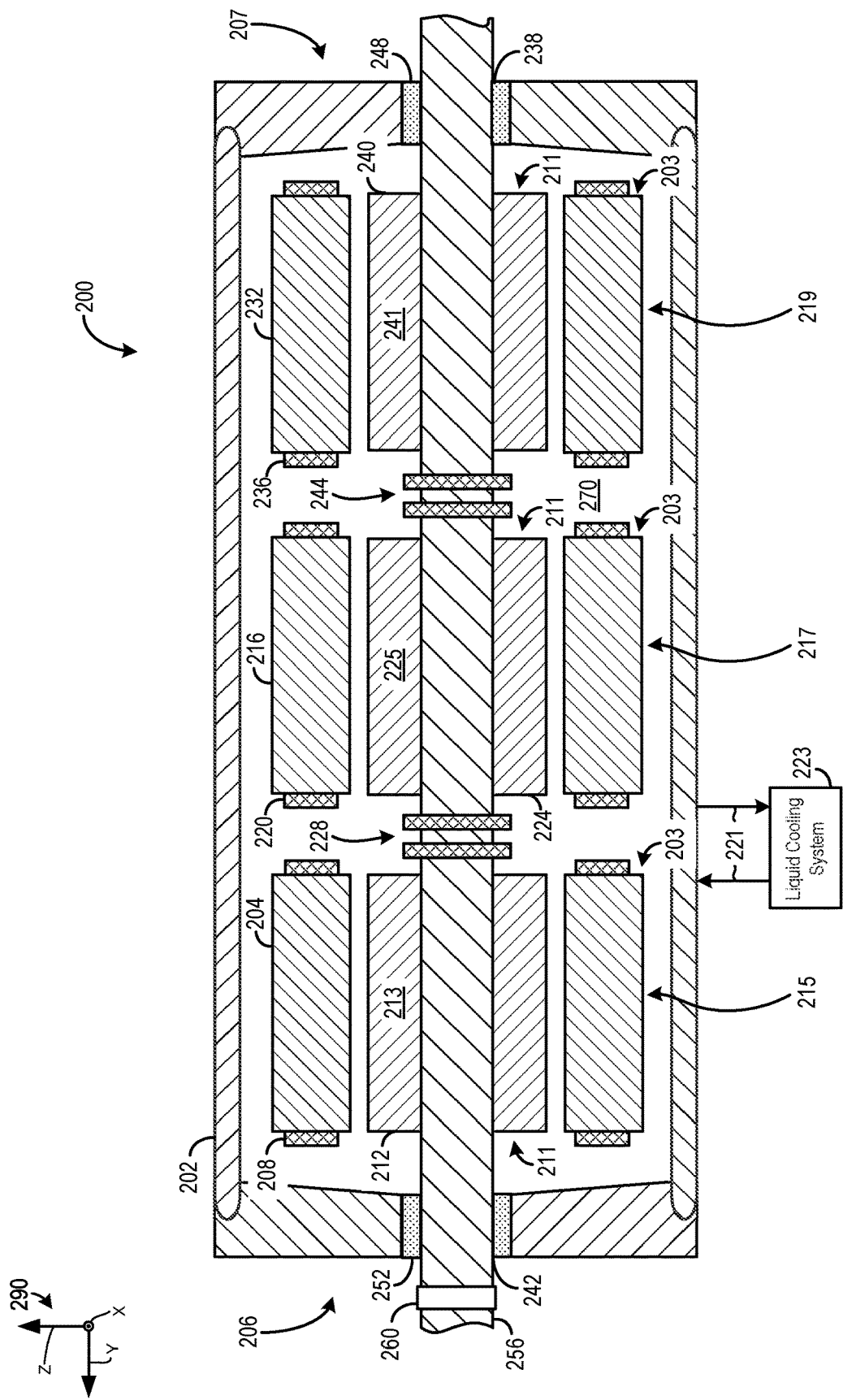
FIG. 2 shows a schematic example of a three-phase electric motor including three motor sections, according to the present disclosure.
Figure 3:
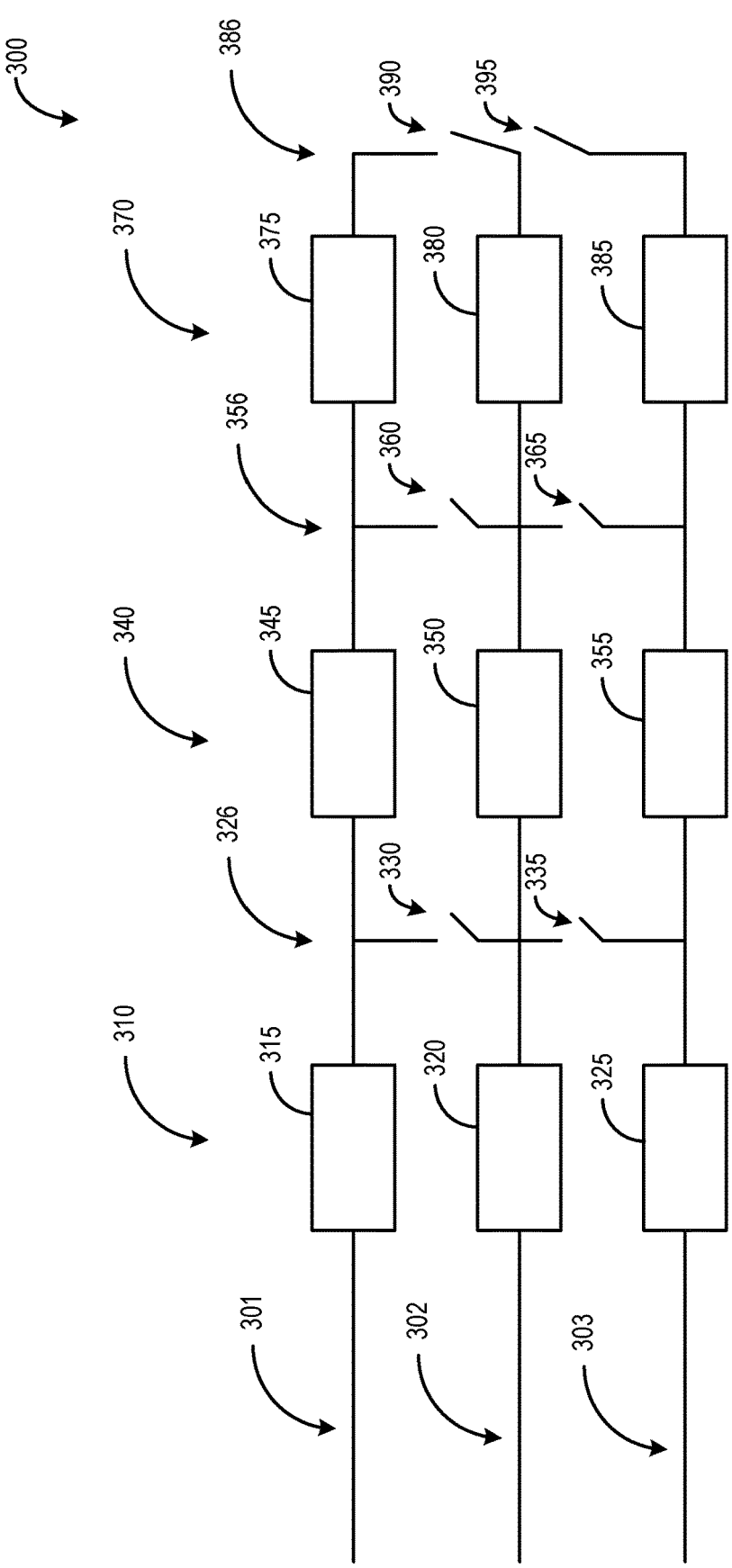
FIG. 3 shows a schematic example of a wiring configuration of a three-phase motor, in accordance with FIG. 2.
Figure 4:
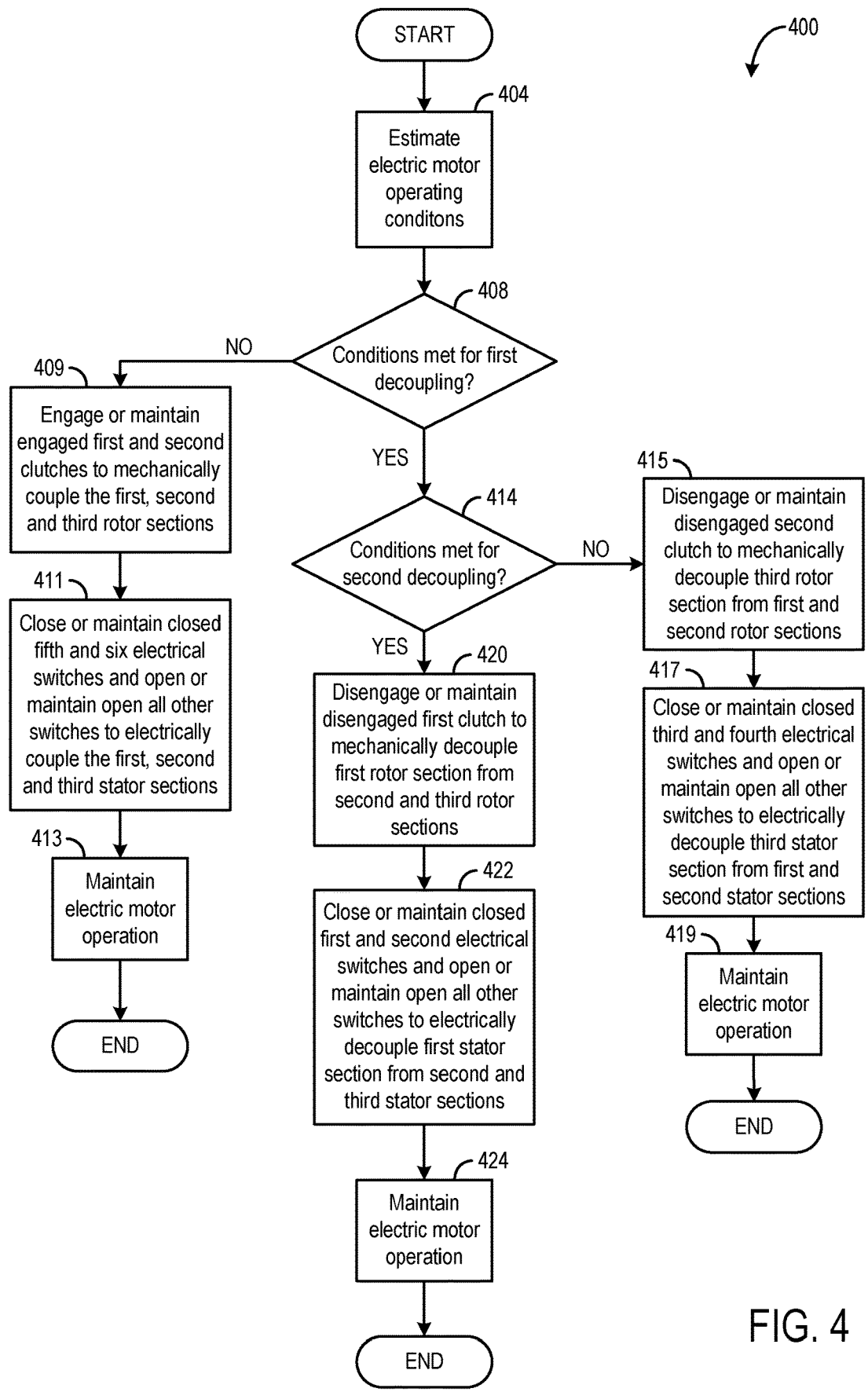
FIG. 4 shows a flow chart of an example method for coupling and decoupling the sections of the electric motor of FIG. 2.
Figure 5:
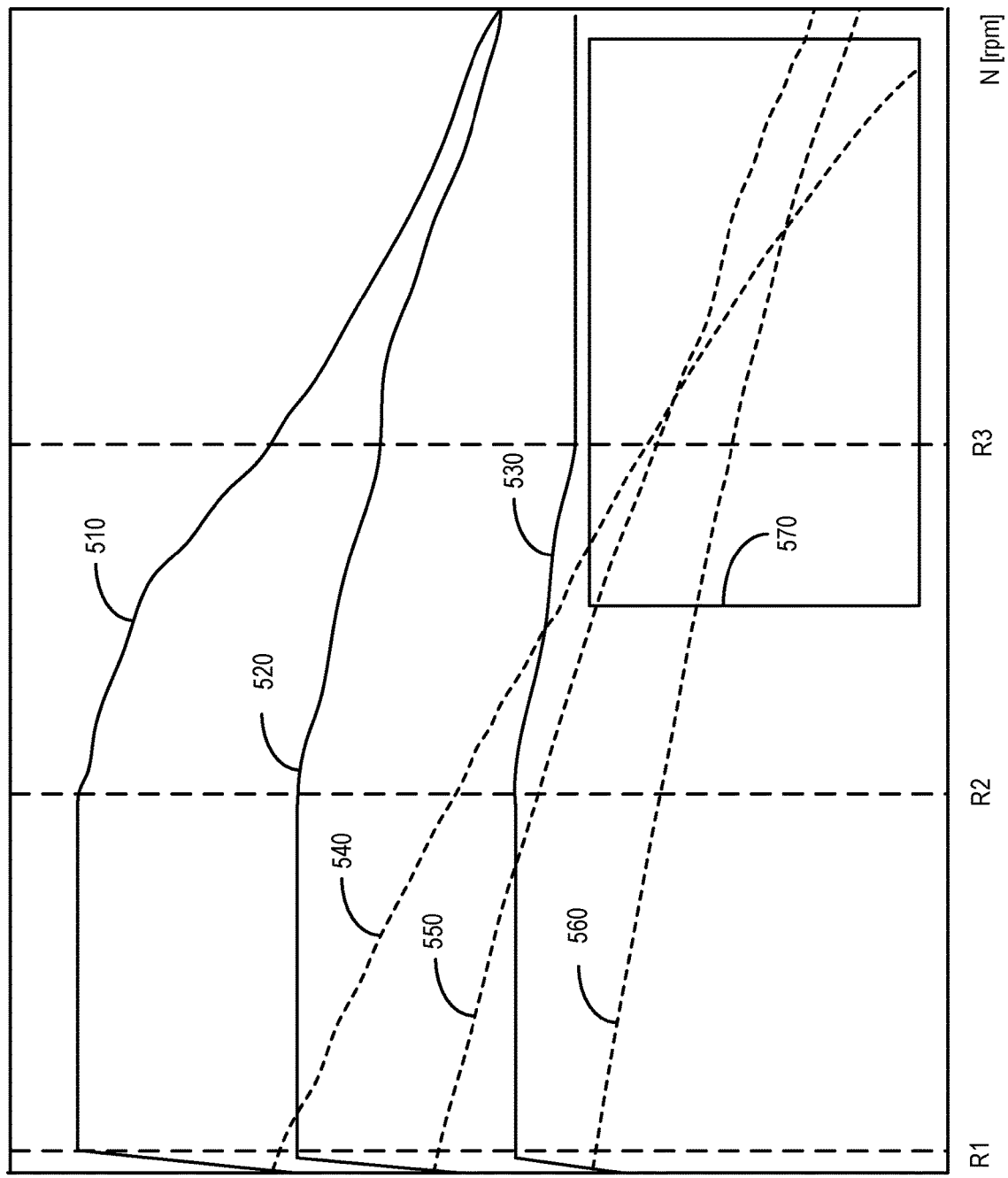
FIG. 5 shows a first plot of motor torque versus motor speed for example mechanical and electrical couplings of the motor sections of the electric motor of FIG. 2.
Figure 6:
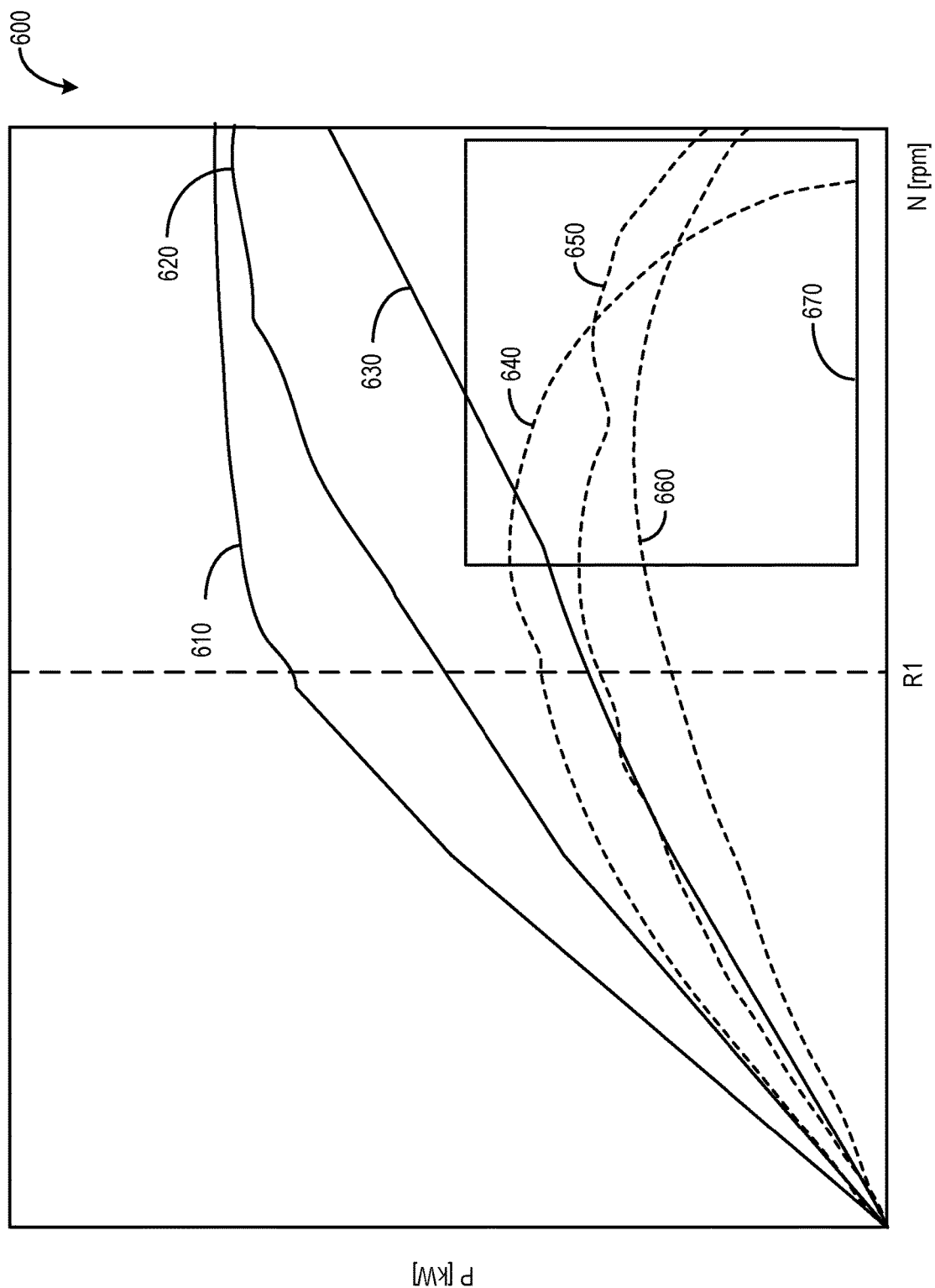
FIG. 6 shows a second plot of motor power versus motor speed for example mechanical and electrical couplings of the motor sections of the electric motor of FIG. 2.
Figure 7:
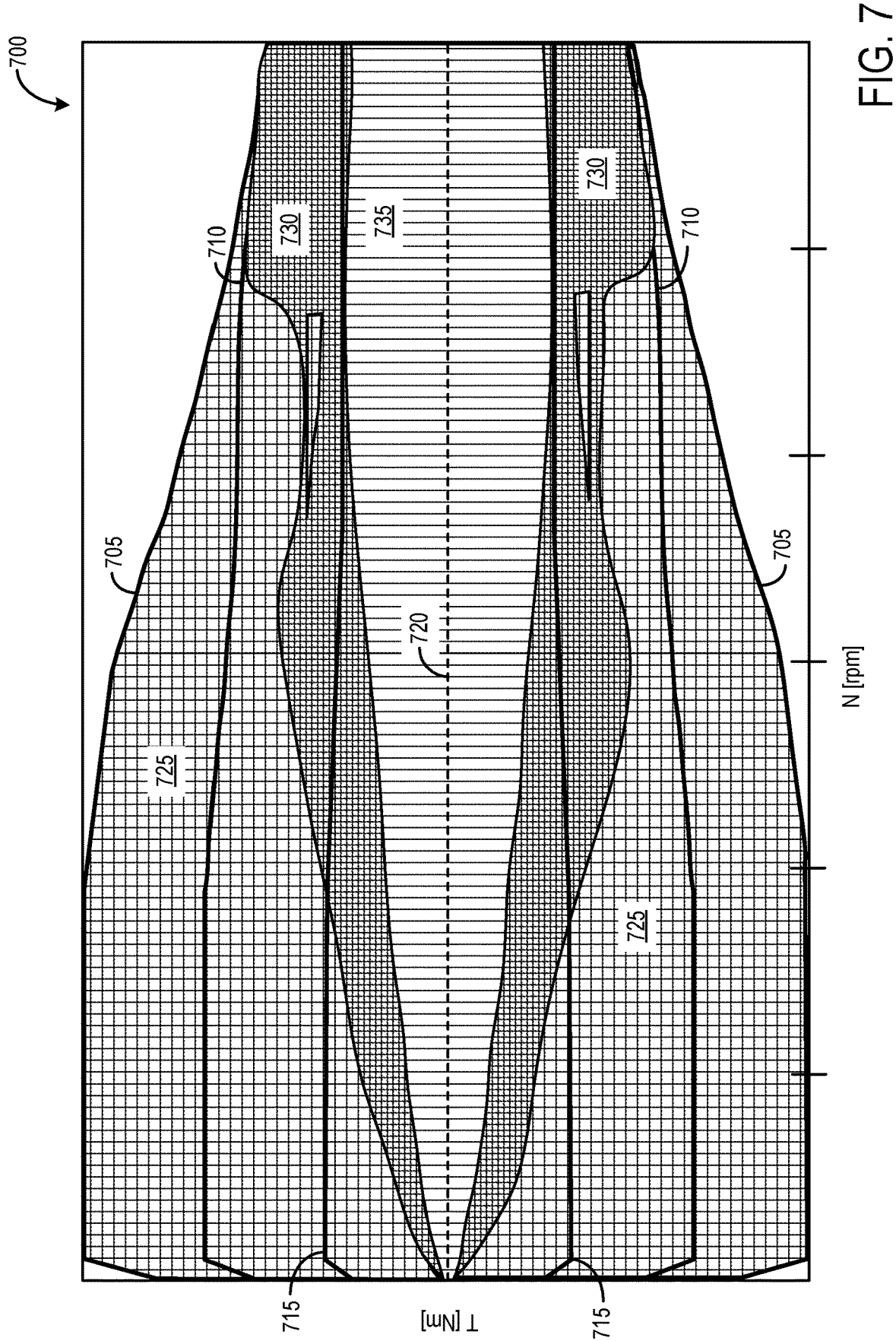
FIG. 7 shows a plot of efficiency of motor operation as a function of torque and motor speed, with regions of optimal efficiency corresponding to one, two, and three motor sections operating for example mechanical and electrical couplings of the motor sections of the electric motor of FIG. 2.

The following description relates to systems and methods for operating a segmented electric motor of a vehicle. The vehicle may be an electric vehicle, or a hybrid electric vehicle; an example embodiment of a hybrid electric vehicle is shown in FIG. 1. Included in the vehicle is the electric motor, including a plurality of motor sections. An embodiment of an electric motor including three motor sections is shown in FIG. 2. Adjacent rotor sections of the electric motor may be separated via clutches, which may be used to mechanically couple and decouple the plurality of rotor sections from each other. Correspondingly, a plurality of stator sections of the electric motor may be electrically coupled and decoupled from each other via electric switches. An example electrical wiring of the three stator sections with corresponding three phases is shown in FIG. 3. Mechanically coupling and decoupling of the rotor sections, and the corresponding electrical coupling and decoupling of the stator sections may be operated in order to optimize efficiency of the electric motor; a flowchart for a method for adjusting the number of active motor sections according to efficiency of motor operation is shown in FIG. 4. Performance curves are provided, illustrating performance of the electric motor in the case of one section, two sections, and all three sections of the electric motor in operation. In particular, FIG. 5 illustrates torque versus motor speed of the electric motor in the case of one section, two sections, and three sections of the electric motor in operation. FIG. 6 illustrates motor power versus motor speed of the electric motor in the case of one section, two sections, and three sections of the electric motor in operation. FIG. 7 illustrates motor efficiency as a function of torque and motor speed, with regions of optimal efficiency with one, two, and three motor sections, and including peak traction curves corresponding to one, two and three motor sections.

FIG. 1 shows a schematic depiction of a vehicle system 100. The vehicle system 100 includes an engine system 140 and an electric machine (motor) 52. The vehicle may be propelled by one or both of engine torque and motor torque. The engine 140 may include a plurality of engine cylinders wherein combustion of air and fuel may occur and power generated at a cylinder may be transmitted to a crankshaft via a piston.

Electric machine 52 may be a motor or a motor/generator. Electric machine 52 receives electrical power from a traction battery 58 via an inverter 57 which may convert DC power from the traction battery 58 to AC power, to provide torque to vehicle wheels 55. Electric machine 52 may also be operated as a generator to provide electrical power to charge battery 58, for example during a braking operation. Electric machine 52 may be a three phase permanent magnet electric motor and may include a plurality of stator sections which may be electrically coupled and decoupled during operation of the electric machine 52, and may include a plurality of corresponding rotor sections which may be mechanically coupled and decoupled during operation of the electric machine 52. Each stator section of the plurality of stator sections and each corresponding rotor of the plurality of rotor sections may form a plurality of motor sections. The composition of the plurality of motor sections of the electric machine 52 is described further in relation to FIG. 2.

Crankshaft of engine 140 and electric machine 52 are connected via a transmission 54 to vehicle wheels 55 when one or more clutches 56 are engaged. In the depicted example, a first clutch 56 is provided between crankshaft of the engine 140 and electric machine 52, and a second clutch 56 is provided between electric machine 52 and transmission 54. A controller 112 may send a signal to an actuator of each clutch 56 to engage or disengage the clutch, so as to connect or disconnect crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Controller 112 may comprise a portion of a control system 114. Control system 114 is shown receiving information from a plurality of sensors 116 and sending control signals to a plurality of actuators 181. As one example, sensors 116 may include engine sensors such as exhaust gas sensor, engine coolant temperature sensor, etc. Other sensors such as pressure, temperature, air/fuel ratio, and composition sensors may be coupled to various locations in the vehicle system 100. As another example, the actuators may include fuel injector, throttle, fuel pump, transmission system pump, etc. The control system 114 may include a controller 112. The controller may receive input data from the various sensors, process the input data, and trigger the actuators in response to the processed input data based on instruction or code programmed therein corresponding to one or more routines.

In one example, controller 112 may be utilized in a method for operating the electric machine 52. During operation of electric machine 52, a back EMF may be generated in response to the changing magnetic flux through the plurality of rotor sections of electric machine 52 due to the rotation of the rotor sections, opposing the applied voltage to conductive windings within the plurality of stator sections of electric machine 52. Back EMF may be countered by a control method called field oriented control, whereby a variable frequency drive implemented by controller 112 may be supplied via inverter 57 to the conductive windings of electric machine 52. The variable frequency drive may reduce a first portion of the current in the conductive windings of the plurality of stator sections that contributes to the back EMF, while increasing a second portion of the current in the conductive windings of the stator sections which contributes to the torque of electric machine 52. In particular, the voltage supplied to the conductive windings can be thought of a sum of two contributions, including a torque producing part of the current (along the "q-axis" of a cross-sectional plane perpendicular to the axis of the electric motor) and a flux producing part of the current (along the "d-axis" of the cross-sectional plane perpendicular to the axis of the electric motor), each of which may be manipulated independently. A (d,q) coordinate system is a dynamic coordinate system co-rotating with the plurality of rotor sections of electric machine 52, and the current along the d-axis of the stator is referenced to, or in-line with, the axis of the rotor's magnetic flux. By adjusting the d-axis current, the flux through the rotor may be adjusted. In particular, positive d-axis current increases flux through the plurality of rotor sections, whereas negative d-axis current decreases flux through the rotor sections. More specifically, applying negative d-axis current weakens the field of the permanent magnets, (in other words, applies field weakening to the magnetic field of the permanent magnets of the rotor). By applying a negative d-axis current, rotor flux may be reduced, such that more of the drive's bus voltage is used to increase the speed of the electric machine 52, rather than being used to overcome back EMF.

In another example, controller 112 may be utilized in a method for operating the electric machine 52. In this example, the electric machine 52 may be operated in a first condition, with each rotor section of the plurality of rotor sections mechanically coupled to each other, and each stator section of the plurality of stator sections electrically coupled to each other, and in a second condition with at least one rotor section of the plurality of rotor sections mechanically decoupled, via a clutch, from remaining rotor sections of the plurality of rotor sections, and at least one stator section of the plurality of stator sections electrically decoupled, via switches, from remaining stator sections of the plurality of stator sections. The first condition may correspond to the operating conditions of the electric motor being in a first region of an efficiency map, the efficiency map being a function of torque and speed of the electric motor, and the second condition may correspond to the operating conditions of the electric motor being in a second region of the efficiency map. The efficiency map is further described in relation to FIG. 7.

Additionally, during acceleration of the electric machine 52, the electric machine may transition from operation with each motor section of the two or more motor sections active to operating the electric machine 52 with at least one motor section inactive by first mechanically decoupling the at least one motor section from remaining motor sections of one or more motor sections and then electrically decoupling the at least one motor section from the remaining motor sections. Maintaining each motor section active includes maintaining mechanical coupling between the first rotor section, the second rotor section, and the third rotor section via a first clutch and a second clutch, and maintaining each of the first stator section, the second stator section, and the third stator section electrically coupled via the electrical switches. In contrast, operating the electric motor with the at least one section inactive may include decoupling the second clutch while maintaining the first clutch engaged to mechanically decouple the third rotor section from each of the first rotor section and the second rotor section, and opening each of a third set of switches and a first set of switches while closing a second set of switches to electrically decouple the third stator section from each of the first stator section and the second stator section. Further details for operation of the electric machine 52 comprised of multiple motor sections are described in relation to FIG. 4.

FIG. 2 illustrates a cross-sectional view of an example of an electric motor 200. Electric motor 200 may correspond to electric machine 52 of FIG. 1. It will be appreciated that the cross-sectional view of FIG. 2 is taken through a radially aligned plane, such as the y-z plane of a coordinate system 290. The electric motor 200 may be deployed in variety of operating environments including: automotive applications (e.g., light, medium, and heavy duty vehicles), industrial settings, agricultural equipment, etc. For instance, in one use-case scenario, the electric motor 200 may be integrated into a hybrid vehicle or battery electric vehicle (BEV).

The electric motor 200 includes a housing 202 that completely or partially encloses all internal components. A plurality of stator sections 203, including a first stator section 204, a second stator section 216, and a third stator section 232 may be enclosed within the housing 202. Each of the plurality of stator sections 203 may be coaxially aligned and linearly spaced along an axis defined by an output shaft 256. The respective lengths of the first stator section 204, the second stator section 216, and the third stator section 232 may be optimized for operation at different speeds. In one example, the plurality of stator sections 203 may all be of the same length along the y-axis of coordinate system 290. In another example, the first stator section 204 may be longer than the second stator section 216 along the y-axis of coordinate system 290, and the second stator section 216 may be longer than the third stator section 232 along the y-axis of coordinate system 290. In this way, a sufficient amount of torque may be supplied during high speed operation, during which one or more of the second stator section 216 and the third stator section 232 may be decoupled from the electromagnetically active part of the electric motor 200. Additionally, while the current embodiment shown of the electric motor 200 contains three stator sections, the electric motor 200 may include any number of stator sections greater than one (such as 2, 4, etc.).

Each of the first stator section 204, the second stator section 216, and the third stator section 232 includes a set of windings, with each set of windings carrying three distinct phases of current. In particular, a first set of windings 208 corresponds to the first stator section 204, a second set of windings 220 corresponds to the second stator section 216, and a third set of windings 236 corresponds to the third stator section 232. Each set of windings in the plurality of windings 208, 220, 236 may include a plurality of wound or hairpin conductive wires (e.g., round wires, rectangular wires, flat wires, etc.) which extend beyond a core of each respective stator section of the plurality of stator sections 203. However, it will be appreciated that the cores of each of the plurality of stator sections 203 also includes wire sections which extend therethrough. Further, each of the plurality of stator sections 203 may receive electrical energy from an energy storage device (such as traction battery 58 of FIG. 1) and in some cases, such as when the motor is designed with regeneration functionality, transfer electrical energy to the energy storage device. Connections of each of the three phases with each of the plurality of stator sections 203 are made in series, and the connections between the three phases for each stator section may be switched on and off sequentially. In particular, the plurality of stator sections 203 may include a first set of switches positioned between the first stator section 204 and the second stator section 216 configured to electrically decouple the first stator section 204 from the second stator section 216, a second set of switches positioned between the second stator section 216 and the third stator section 232, and a third set of switches configured to form terminal connections for the third stator section 232. The switches for the three phases of each stator section of the plurality of stator sections 203 is described in further detail in relation to FIG. 3.

The electric motor 200 further includes a plurality of rotor sections 211, such as a first rotor section 212, a second rotor section 224, and a third rotor section 240, the plurality of rotor sections 211 spaced linearly and arranged coaxially along the output shaft 256. While the current embodiment shown of the electric motor 200 includes three rotor sections, the electric motor 200 may include any number of rotor sections matching the number of corresponding stator sections of the plurality of stator sections 203.

Each rotor section of the plurality of rotor sections 211 may contain a rotor core. In particular, the first rotor section 212 may include a first rotor core 213, the second rotor section 224 may include a second rotor core 225, and the third rotor section 240 may include a third rotor core 241. Each rotor core of the plurality of rotor sections 211 includes a plurality of metal laminations (e.g., laminated magnetic steel or iron) and a solid magnetic metal. Thus, each rotor core of the plurality of rotor sections 211 includes a magnetically interactive portion, in this case a permanent magnet. It will be appreciated that during operation of the electric motor, the plurality of rotor sections 211 may rotate relative to the y-axis of coordinate system 290 while the plurality of stator sections 203 is held relatively stationary.

The electric motor 200 may include clutches in between adjacent rotor sections, in order to allow for mechanical coupling and decoupling of rotor sections during motor operation. In particular, electric motor 200 may include a first clutch 228 positioned between the first rotor section 212 and the second rotor section 224 configured to mechanically decouple the first rotor section 212 from the second rotor section 224, and a second clutch 244 positioned between the second rotor section 224 and the third rotor section 240 configured to mechanically decouple the second rotor section 224 from the third rotor section 240. Each of the clutches 228, 244 may be a slip clutch. During mechanical decoupling, detachment of the clutches 228, 244 in between adjacent rotor sections may allow for synchronous or approximately synchronous motion of the mechanically decoupled rotor sections, due to continued operation of the stator sections, before electrically decoupling the corresponding stator sections. However, upon initiating recoupling of the decoupling rotor and stator sections, there will be a mismatch of the speed of the rotating magnetic field generated by the recoupled stator section, and the speed of the recoupled rotor section. For example, in electrically recoupling the second stator section 216 to the first stator section 204 and then mechanically recoupling the second rotor section 224 to the first rotor section 212, the magnetic field generated by the second stator section 216 will rotate as the same speed as the magnetic field generated by the first stator section 204. In contrast, upon electrical recoupling of the second stator section 216, the second rotor section 224 will initially be at a standstill, and subsequent mechanical recoupling of the first rotor section 212 and the second rotor section 224 may introduce unwanted torque ripple and vibration. Hence, during recoupling, the rotor sections will be mechanically coupled first for speed synchronization, with electrical coupling of the stator sections following. For example, the second rotor section 224 may be recoupled to the first rotor section 212 via the first clutch 228, which will synchronize rotation of the first rotor section 212 and the second rotor section 224. During this stage the torque, generated by the electric motor 200 may remain uninterrupted, and the currents in the first rotor section 212 and the first stator section 204 may be unaffected. Following mechanical recoupling and speed synchronization of the first rotor section 212 and the second rotor section 224, the second stator section 216 may be electrically recoupled to the first stator section 204. Electrical recoupling of the second stator section 216 to the first stator section 204 may be accomplished by again decoupling the second rotor section 224 from the first rotor section 212 via the first clutch 228. Simultaneously, the second stator section 216 may be electrically recoupled to the first stator section 204 by first bringing the stator current to zero, then electrically recoupling the second stator section 216 to the first stator section 204 via closing the second set of switches 356 while opening the first set of switches 326 and maintaining open the third set of switches 386. Immediately following electrical recoupling, a large d-axis current may be applied to the active stator sections 204, 216, in order to align the magnetic field of the second rotor section 224 with that of the active stator sections 204, 216. During this period, the traction torque produced by the electric motor 200 may be zero, introducing a torque dip over a short period, for example of a few tens of milliseconds. Following alignment of the magnetic field of the second rotor section 224 with the magnetic field of the active stator sections 204, 216, the second rotor section 224 maybe recoupled to the first rotor section 212 via the first clutch 228, and current may be supplied to the active stators 204, 216 in an appropriate manner to generate the traction torque of the electric motor 200. An analogous example may follow for electrically recoupling the third stator section 232 to each of the first stator section 204 and the second stator section 216, and mechanically recoupling the third rotor section 240 to each of the first rotor section 212 and the second rotor section 224 via the second clutch 244.

The first stator section 204 and the first rotor section 212 correspond to a first motor section 215, the second stator section 216 and the second rotor section 224 correspond to a second motor section 217, and the third stator section 232 and the third rotor section 240 correspond to a third motor section 219. Within each of the first motor section 215, the second motor section 217, and the third motor section 219, the corresponding stator section and the corresponding rotor section are configured to electromagnetically interact to generate a rotational output and, in some cases, generate electrical energy responsive to receiving a rotational input from an external source such as a vehicle gear-train, in one use-case example. In particular, in one example, the first motor section 215 may operate as the sole active motor section of the electric motor 200 with each of the second motor section 217 and the third motor section 219 inactive. In another example, the first motor section 215 and the second motor section 217 may operate together in unison as the active portion of the electric motor 200, with the third motor section 219 inactive. In yet another example, each of the first motor section 215, the second motor section 217, and the third motor section 219 may all operate in unison as the electric motor 200. However, as mentioned above, the motor may be used in wide variety of operating environments. As such, the electric motor 200 is configured to generate rotational output and, in some examples, in a regeneration mode, receive rotational input and generate electrical energy output. Thus, the electric motor 200 may be designed to receive electrical energy from the energy storage device and, in some examples, transfer energy to the energy storage device. Wired and/or wireless energy transfer mechanisms may be used to facilitate this energy transfer functionality.

The output shaft 256 may project out of the housing 202 from each of a first end 206 of the electric motor 200 and a second end 207 of the electric motor 200. During operation of the electric motor 200, the rotation of the plurality of rotor sections 211 generated from the electromagnetic interaction of the plurality of rotor sections 211 and the plurality of stator sections 203 may generate torque on the output shaft 256, causing the output shaft 256 to rotate. The output shaft 256 is coupled to the housing 202, and is rotating relative to the housing 202. The rotation of the output shaft 256 relative to the housing 202 is mediated by a first bearing 252, placed between the output shaft 256 and the housing 202 at the first end 206 of the electric motor 200, and a second bearing 248, placed between the output shaft 256 and the housing 202 at the second end 207 of the electric motor 200. The placement of the bearings 252, 248 may permit the output shaft 256 to rotate relative to the housing 202, while allowing an interior 270 of the housing 202 and the components contained therein to be fluidly sealed off from the external environment. Roller element bearings, plain bearings, and the like may be selected for use based on motor design targets. The first bearing 252 and the second bearing 248 may each be enclosed in the housing 202, in the illustrated embodiment. Additionally, a first liquid seal 242 may be included between the output shaft 256 and the first bearing 252 at the first end 206, and a second liquid seal 238 may be included between the output shaft 256 and the second bearing 248 at the second end 207, in order to prevent leaking from the housing 202 during operation of the electric motor 200. Additionally included on the output shaft 256 (shown here in a non-limiting manner as included on the output shaft 256 on the first end 206 of the electric motor 200) of the electric motor 200 is a resolver 260, which measures the absolute rotation of the output shaft 256. For example, the resolver may be a multi-speed resolver, may sense the degree of rotation of the output shaft 256, and may send one or more sinusoidal electrical signals to a controller (such as controller 112 of FIG. 1) indicating the degree of rotation of the output shaft 256. It is noted that while the electric motor 200 may include a plurality of rotor sections 211 and a corresponding plurality of stator sections 203, the electric motor 200 may operate with a single resolver 260.

The electric motor 200 may further contain a liquid cooling system 223. Liquid cooling system 223 may be configured to circulate a liquid coolant (such as oil) throughout the housing 202, in order to cool the components of electric motor 200 contained therein. In one example, the liquid cooling system 223 may circulate coolant into the system via internal channels within the housing 202. In this example, coolant circulated through internal channels in the housing 202 may then be utilized for stator cooling. In another example, the liquid cooling system 223 may circulate coolant through internal channels in the output shaft 256, which may then be used for rotor cooling. The liquid cooling system 223 may also include a heat exchanger to cool the coolant oil and a pump for circulating the coolant oil. The coolant oil circulating system may also include a reservoir (e.g., sump). In the example embodiment given, liquid cooling system 223 may be configured to circulate coolant oil through the housing 202 via fluid lines 221. Further, circulation of coolant oil may be facilitated through drainage to and pumping from a reservoir contained within the liquid cooling system 223 through fluid lines 221. However, other example embodiments of liquid cooling system 223 maybe used, and the given embodiment is intended to be illustrative and not limiting in any sense.

The housing 202 may be constructed out of a metal such as steel, aluminum, combinations thereof, etc. In one example, the housing may constructed out of aluminum due to its higher thermal conductivity than steel, for example. However, the housing 202 constructed out of steel may be used due to its lower cost and/or higher durability. The conductive wires in the windings 208, 220, 236 may be constructed out of an electrically conductive material such as copper. The stator sections 204, 216, 232 may also be constructed out of steel (e.g., laminated steel), and electrically insulating sleeves may be provided between the contact points of the windings 208, 220, 236, and the stator sections 204, 216, 232. Further, the plurality of rotor sections 211 may be constructed out of laminated electrical steel, and may include embedded permanent magnets therein.

While the embodiment described above focuses on permanent magnet synchronous motors, a variety of suitable electric motor configurations may be used depending on the end-use design goals. For example, the motor may be an alternating current (AC) motor or a direct current (DC) motor. AC motor types include asynchronous (e.g., squirrel cage and wound rotor) and synchronous style motors. Synchronous motors, such as multiphase motors, may be used in certain embodiments. The styles of multiphase motors that may be deployed include permanent magnet, synchronous reluctance, hybrid synchronous (e.g., permanent magnet assisted synchronous reluctance), synchronous induction, and hysteresis. Continuing with the AC motor use-case, a synchronous permanent magnet motor may be utilized, in some instances, due to its relatively high conversion efficiency.

FIG. 3 shows a schematic depiction of a system of switches 300 for three phases of an electric motor (such as electric motor 200 of FIG. 2), including a first phase 301, a second phase 302, and a third phase 303, where each phase of the three phases of the electric motor are coupled in series for each of the three stator sections (such as stator sections 204, 216, and 232 of FIG. 2). In particular, a first set of windings 310 corresponds to a first stator section (such as the first stator section 204 of FIG. 2) of the electric motor, a second set of windings 340 corresponds to a second stator section (such as the second stator section 216 of FIG. 2) of the electric motor, and a third set of windings 370 corresponds to a third stator section (such as the third stator section 232 of FIG. 2) of the electric motor. Within a given section of the system of switches 300, there are winding coils schematically indicated in FIG. 3 by rectangles. In particular, within the first set of windings 310, a first winding coil 315 is given for the first phase 301 of the first stator section, a second winding coil 320 is given for the second phase 302 of the first stator section, and a third winding coil 325 is given for the third phase 303 of the first stator section. Within the second set of windings 340, a fourth winding coil 345 is given for the first phase 301 of the second stator section, a fifth winding coil 350 is given for the second phase 302 of the second stator section, and a sixth winding coil 355 is given for the third phase 303 of the first stator section. And finally, within the third set of windings 370, a seventh winding coil 375 is given for the first phase 301 of the third stator section, an eighth winding coil 380 is given for the second phase 302 of the third stator section, and a ninth winding coil 385 is given for the third phase 303 of the third stator section.

Each of the three phases may receive input from a bus bar (not shown), the bus bar receiving a voltage input from an inverter (such as inverter 57 of FIG. 1), which in turn receives a voltage input from a battery (such as traction battery 58 of FIG. 1). In this configuration, each phase for the three stator sections is connected in series, and switches are given in between the connections corresponding to adjacent stator sections. In particular, each of the first winding coil 315 of the first stator section, the fourth winding coil 345 of the second stator section, and the seventh winding coil 375 of the third stator section correspond to a first phase 301 of current, each of the second winding coil 320 of the first stator section, the fifth winding coil 350 of the second stator section, and the eighth winding coil 380 of the third stator section correspond to a second phase 302 of current, and each of the third winding coil 325 of the first stator section, the sixth winding coil 355 of the second stator section, and the ninth winding coil 385 of the third stator section correspond to a third phase 303 of current.

Connecting the three phases of each stator section are three sets of switches, including a first set of switches 326, a second set of switches 356, and a third set of switches 386. In particular, a first set of switches 326 may be positioned between the first stator section and the second stator section configured to electrically decouple the first stator section from the second stator section, a second set of switches 356 may be positioned between the second stator section and the third stator section, and a third set of switches 386 may be configured to form terminal connections for the third stator section. The first set of switches 326 includes a first switch 330 coupling a first set of windings of the first stator section to a second set of windings of the first stator section, and a second switch 335 coupling the second set of windings of the first stator section to a third set of windings of the first stator section. Correspondingly, the second set of switches 356 includes a third switch 360 coupling a first set of windings of the second stator section to a second set of windings of the second stator section, and a fourth switch 365 coupling the second set of windings of the second stator section to a third set of windings of the second stator section. And finally, the third set of switches 386 includes a fifth switch 390 coupling a first set of windings of the third stator section to a second set of windings of the third stator section, and a sixth switch 395 coupling the second set of windings of the third stator section to a third set of windings of the third stator section.

During operation of the electric motor, the stator sections of the electric motor may be configured to operate either with all three stator sections connected in series via maintaining closed the fifth switch 390 and the sixth switch 395 and opening all other switches, with the first stator section and the second stator section connected in series via maintaining closed the third switch 360 and the fourth switch 365 and opening all other switches, or with solely the first stator section operating by maintaining closed the first switch 330 and the second switch 335 and opening all other switches. The above electric coupling scenarios may be taken in parallel with corresponding mechanical coupling scenarios for each of a plurality of rotor sections (such as the plurality of rotor sections 211 of FIG. 2). Electrical coupling and decoupling of the stator sections in conjunction with mechanical coupling and decoupling of the rotor sections is described further in relation to FIG. 4.

FIG. 4 shows an example method 400 to operate an electric motor (such as electric motor 200 of FIG. 2) in a vehicle (such as vehicle 100 of FIG. 1). Method 400 will be described in reference to the systems described herein and with regard to FIGS. 1-3, but it should be understood that similar methods may be applied to other systems without departing from the scope of this disclosure. Method 400 and all other methods described herein may be carried out by control system 114, and may be stored at the controller 112 in non-transitory memory. Instructions for carrying out method 400 may be executed by the controller 112 in conjunction with signals received from sensors of the vehicle system, such as the sensors described above with reference to FIG. 1. The controller may employ actuators 181 of the vehicle system to adjust operation of the vehicle, according to the methods described below.

At 404, method 400 may estimate operating conditions of the electric motor. Estimating motor operating conditions may include determining the speed of the electric motor. Estimating the speed of the motor may be accomplished via a motor speed sensor (not shown) mounted on an output shaft (such as output shaft 256 of FIG. 2), which may determine the rotational speed and the direction of rotation of the output shaft. In another example, the speed of the motor may be determined via an absolute position sensor (such as resolver 260 of FIG. 2) mounted to the output shaft of the electric motor, adapted to detect the degree of rotation of the output shaft. Estimating motor operating conditions may further include determining the torque production of the electric motor, which may be determined by estimating the power supply to the electric motor from a traction battery (such as traction battery 58 of FIG. 1) via an inverter (such as inverter 57 of FIG. 1) by the controller. Motor operating conditions may also include estimating a current through windings (such as windings 208, 220, 236 of FIG. 2) of stator sections (such as stator sections 204, 216 and 232 of FIG. 2) of the electric motor. From estimation of the current and the power supplied, estimations of the power output of the electric motor and load of the electric motor may be obtained. An additional operating condition of the electric motor is temperature during engine operation, which may be determined by a temperature sensor (not shown), such as proximal to windings within of the stator.

At 408, method 400 may determine if the conditions are met for a first decoupling, whereby a third rotor section (such as third rotor section 240 of FIG. 2) may be mechanically decoupled from each of a first rotor section (such as first rotor section 212 of FIG. 2) and a second rotor section (such as second rotor section 224 of FIG. 2), and the third stator section may be electrically decoupled from each of the first stator section and the second stator section. Conditions for initiating the first decoupling may be based on transitioning between regions of a pre-calibrated efficiency standards built into an efficiency map of the controller, such as the efficiency map depicted in FIG. 7. In particular, the efficiency map of FIG. 7 plots torque generated by the electric motor versus speed of the electric motor, with a first region of the plot illustrating optimally efficient operation of the electric motor as a function of torque and speed while operating with three motor sections, a second region of the plot illustrating optimally efficient operation of the electric motor as a function of torque and speed while operating with two motor sections, and a third region of the plot illustrating optimally efficient operating of the electric motor as a function of torque and speed while operating with a single motor section. The condition for initiating the first decoupling may include transitioning from a first region of the plot to a second region of the plot, due to a change in torque, a change in electric motor speed, or both. Additionally, the conditions for initiating the first decoupling may depend of the power supplied to the electric motor by a power supply and a temperature of the electric motor. In one example, the conditions for the first decoupling may be adaptively determined by comparing motor temperature and power supply to the electric motor to values in a look-up table stored in the controller's memory. In another example, the conditions for the first decoupling may be adaptively determined by comparing motor temperature and power supply to the electric motor to a mathematical function based off of the motor temperature and power supply to the electric motor, to be computed by the controller. Yet another operating condition may be that in a hybrid operation, where the vehicle receives power from both an electric motor and an engine (such as engine system 140 of FIG. 1), fuel consumption is minimized. Additionally, in order to prevent too frequent coupling/decoupling at the boundary between two regions (e.g. the first region and the second region), switching may be limited to a threshold number of switches per minute, in order to maintain ease of drivability for a vehicle operator. In another example, a hysteresis controller may be utilized to prevent too frequent coupling/decoupling at the boundary between two regions. Operating conditions of the electric motor (such as temperature, power supply, speed, and torque) and the fuel consumption may then be compared to the conditions for initiating the first decoupling. If the operating conditions of the electric motor and the fuel consumption of the engine satisfy the conditions for initiating the first decoupling, method 400 may proceed to 409.

At 409, method 400 may proceed to engage or maintain engaged each of the first clutch (such as first clutch 228 of FIG. 2) and a second clutch (such as second clutch 244 of FIG. 2) of the electric motor in order to maintain mechanical coupling of the third rotor section to each of a first rotor section (such as first rotor section 212 of FIG. 2) and a second rotor section (such as second rotor section 224 of FIG. 2). Maintaining mechanical coupling of the three rotor sections may allow for sufficient torque production of the electric motor, without generating back EMF losses that are too high, within the parameters as determined by efficiency map of the controller.

At 411, method 400 may command closing or maintain closing of each of a fifth switch (such as fifth switch 390 of FIG. 3) and a sixth switch (such as sixth switch 395 of FIG. 3) of a system of switches (such as system of switches 300 of FIG. 3) while opening or maintaining open all other switches in the system of switches, in order to maintain electrical coupling of the third stator section to each of a second stator section (such as second stator section 216 of FIG. 2) and a third stator section (such as third stator section 232 of FIG. 2). Maintaining electrical coupling of the three stator sections in conjunction with maintaining mechanical coupling of the three rotor sections in 409 may allow for sufficient torque production of the electric motor, without generating back EMF losses that are too high, within the parameters as determined by efficiency map of the controller.

At 413, method 400 may maintain operation of the electric motor by maintaining the third rotor section mechanically coupled to each of the first rotor section and the second rotor section by maintaining each of the first clutch and the second clutch coupled, and by maintaining the third stator section electrically coupled to each of the first stator section and the second stator section by maintaining each of the fifth switch and the sixth switch closed and all other switches open. In this way, the electric motor may operate as a single unit, with three rotor sections mechanically coupled in series, and three stator sections electrically coupled in series. Via the electrical and mechanical couplings described above, the three motor sections (such as first motor section 215, second motor section 217, and third motor section 219 of FIG. 2) may operate in unison. Following 413, the method may end.

Returning to 408, if it is determined that operating conditions of the electric motor and fuel consumption of the engine satisfy the conditions for initiating the first decoupling, method 400 may proceed to 414 to determine if the conditions are met for a second decoupling. The second decoupling may include mechanically decoupling each of the second rotor section and the third rotor section from the first rotor section, in addition to electrically decoupling each of the second stator section and the third stator section from the first stator section in order to increase efficiency of the electric motor during operation of the electric motor. Conditions for initiating the second decoupling may be based on transitioning between regions of a pre-calibrated efficiency standards built into the efficiency map of the controller, such as the efficiency map depicted in FIG. 7. In particular, the condition for initiating the second decoupling may include transitioning from the second region of the plot to the third region of the plot. Additionally, the conditions for initiating the second decoupling may depend of the power supplied to the electric motor by a power supply and a temperature of the electric motor. In one example, the conditions for the second decoupling may be adaptively determined by comparing motor temperature and power supply to the electric motor to values in a look-up table stored in the controller's memory. In another example, the conditions for the second decoupling may be adaptively determined by comparing motor temperature and power supply to the electric motor to a mathematical function based off of the motor temperature and power supply to the electric motor, to be computed by the controller. Yet another operating condition may be that in a hybrid operation, where the vehicle receives power from both an electric motor and the engine, fuel consumption is minimized. Additionally, in order to prevent too frequent coupling/decoupling at the boundary between two regions (e.g. the first region and the second region), switching may be limited to a threshold number of switches per minute, in order to maintain ease of drivability for a vehicle operator. Operating conditions of the electric motor (such as temperature, power supply, speed, and torque) and fuel consumption of the engine may then be compared to the conditions for initiating the second decoupling. If the operating conditions of the electric motor do not satisfy the conditions for initiating the second decoupling, method 400 may proceed to 415.

At 415, method 400 may proceed to engage or maintain disengaged the second clutch of the electric motor while maintaining engaged the first clutch of the electric motor, in order to maintain mechanical coupling of the first rotor section and the second rotor section while mechanically decoupling the third rotor section. Maintaining mechanical coupling of the first two rotor sections may allow for sufficient torque production of the electric motor, without generating back EMF losses that are too high, within the parameters as determined by efficiency map of the controller.

At 417, method 400 may command closing or maintain closing of a third switch (such as third switch 360 of FIG. 3) and a fourth switch (such as fourth switch 365 of FIG. 3) of the system of switches while opening or maintaining open all other switches in the system of switches, in order to maintain electrical coupling of the first stator section and the second stator section while electrically decoupling the third stator section. Maintaining electrical coupling between the first two stator sections with maintaining mechanical coupling of the first two rotor sections in 415 may allow for sufficient torque production of the electric motor, without generating back EMF losses that are too high, within the parameters as determined by efficiency map of the controller.

At 419, method 400 may maintain operation of the electric motor by maintaining mechanically decoupled the third rotor section from each of the first rotor section and the second rotor section by maintaining decoupled the second clutch, and maintaining electrically decoupling of the third stator section from each of the first stator section and the second stator section by maintaining closed each of the third switch and the fourth switch and maintaining open all other switches. In this way, the first motor section and the second motor section may operate in unison and act as a single electric motor, with the third motor section remaining inactive. Following 419, the method may end.

Returning to 414, if it is determined that the operating conditions of the electric motor and the fuel consumption of the engine satisfy the conditions for initiating the second decoupling, method 400 may proceed to 420 to disengage or maintain disengaged the first clutch to mechanically decouple first rotor section from second and third rotor sections. Mechanically decoupling the first rotor section from the second and third rotor sections may allow for operation of the electric motor, while allowing for sufficient torque production of the electric motor, without generating back EMF losses that are too high, within the parameters as determined by efficiency map of the controller.

At 422, method 400 may command closing of a first switch (such as first switch 330 of FIG. 3) and a second switch (such as second switch 335 of FIG. 3) of the system of switches while opening or maintaining open all other switches in the system of switches, in order to electrically decouple the second stator section and third stator section from the first stator section during vehicle operation. Electrically decoupling the first stator section from the second stator section and third stator section with concurrent mechanical decoupling of the first rotor section from the second rotor section and third rotor section in 420 may allow for sufficient torque production of the electric motor, without generating back EMF losses that are too high, within the parameters as determined by efficiency map of the controller.

At 424, method 400 may maintain operation of the electric motor by maintaining mechanically decoupled each of the third rotor section and the second rotor section from the first rotor section by maintaining decoupled the first clutch, and by maintaining electrically decoupled each of the third stator section and the second stator section from the first stator section by maintaining closed each of the first switch and the second switch and maintaining open all other switches. In this way, the first motor section may operate independently as the sole active motor section of the electric motor, while the second motor section and the third motor section remain inactive. Following 424, the method may end.

FIG. 5 shows an example plot 500 of torque generated by an electric motor (such as electric motor 200 of FIG. 2) during operation of the electric motor, with plots for operation of the electric motor with one, two, or all three stator sections (such as the first stator section 204, the second stator section 216, and the third stator section 232 of FIG. 2) active, and one, two or all three rotor sections (such as the first rotor section 212, the second rotor section 224, and the third rotor section 240 of FIG. 2) active, respectively. The x-axis denotes the speed (RPM) of the electric motor powering the vehicle. In one embodiment of a vehicle (such as vehicle 100 of FIG. 1) in which the vehicle in an all-electric vehicle containing a single gear transmission, the speed of the electric motor may be proportional to the speed of the vehicle. In another embodiment of the vehicle, such as in an all-electric vehicle containing a multi-gear transmission or in a hybrid vehicle, the speed of the vehicle may be a more complicated function of the speed of the electric motor. The y-axis denotes a torque generated by the motor.

The example plot 500 shows traction curves, with a first set of traction curves, indicated by solid lines, showing operation of the electric motor with one, two, or three motor sections (such as motor sections 215, 217, and 219 of FIG. 2) under peak torque generation, and a second set of traction curves, indicated by dashed lines, showing operation of the electric motor with one, two, or three motor sections under continuous torque generation. Peak torque refers to the amount of torque the electric motor may generate at a given speed over a short period of time, e.g. one or two minutes, whereas continuous torque refers to the amount of torque the electric motor may generate over an indefinite period. The first traction curve, solid line 510, shows peak torque as a function of motor speed when the electric motor is operating with three motor sections, the second traction curve, solid line 520, shows peak torque as a function of motor speed when the electric motor is operating with two motor sections, and the third traction curve, solid line 530, shows peak torque as a function of motor speed when the electric motor is operating with one motor section. Correspondingly, the fourth traction curve, dashed line 540, shows continuous torque as a function of motor speed when the electric motor is operating with three motor sections, the fifth traction curve, dashed line 550, shows continuous torque as a function of motor speed when the electric motor is operating with two motor sections, and the sixth traction curve, dashed line 560, shows continuous torque as a function of motor speed when the electric motor is operating with one motor section. Additionally, example plot 500 contains an inset 570, illustrating the dashed lines 540, 550, and 560 in a high speed regime.

The dashed lines 540, 550, 560 each indicate continuous torque generated by the electric motor with all three motor sections operating, two motor sections operating, and the first motor section operating, respectively. In this example, the solid lines 510, 520, 530 each can be grouped into four operating regions: a ramp up region below speed R1, a constant plateau demarcated by the region bounded by speed R1 and speed R2, a first decay region bound by speed R2 and speed R3, and a second decay region when speed is greater than speed R3. Solid line 510 has a greater value of torque production than solid line 520 over the whole speed range of the electric motor, and solid line 520 has a greater value of torque production than solid line 530 over the whole speed range of the electric motor. Within the first decay region and the second decay region, the loss of torque indicated by solid line 510 is greater than the loss of torque indicated by solid line 520, and similarly the loss of torque indicated by solid line 520 is less than the loss of torque indicated by solid line 530, with solid line 530 plateauing to a constant value of torque in the second decay region. In this way, solid lines 510-530 illustrate that, as more motor sections are electrically and mechanically decoupled during engine operation, there is less variation in the amount of peak torque generated over the whole speed range of the electric motor, in particular in the first decay region and the second decay region, allowing for more continuous generation of torque in the high speed regime of the electric motor.

The dashed lines 540, 550, 560 each indicate continuous torque generated by the electric motor with all three motor sections operating, two motor sections operating, and the first motor section operating, respectively. As with solid lines 510-530, there is less variation in the amount of continuous torque generated in the high speed regime (denoted by inset 570) as the number of active motor sections is decreased, with dashed line 540 corresponding to all three motor sections active showing the greatest loss of torque, decreasing below dashed lines 550, 560 within inset 570, dashed line 550 corresponding to two motor sections active showing less loss of torque than dashed line 540, and dashed line 560 corresponding to one motor section active showing less loss of torque than dashed lines 540, 550. In this way, dashed lines 540-560 illustrate that, as the number of active motor sections in the high speed regime is decreased, the generation of torque in the high speed regime is more continuous.

FIG. 6 shows an example plot 600 of power generated by an electric motor (such as electric motor 200 of FIG. 2) during operation of the electric motor, with plots for operation of the electric motor with one, two, or all three stator sections (such as the first stator section 204, the second stator section 216, and the third stator section 232 of FIG. 2) active, and one, two or all three rotor sections (such as the first rotor section 212, the second rotor section 224, and the third rotor section 240 of FIG. 2) active, respectively. The x-axis denotes the speed (RPM) of the electric motor powering the vehicle. In one embodiment of a vehicle (such as vehicle 100 of FIG. 1) in which the vehicle in an all-electric vehicle containing a single gear transmission, the speed of the electric motor may be proportional to the speed of the vehicle. In another embodiment of the vehicle, such as in an all-electric vehicle containing a multi-gear transmission or in a hybrid vehicle, the speed of the vehicle may be a more complicated function of the speed of the electric motor. The y-axis denotes power generated by the motor.

The example plot 600 shows traction curves, with a first set of traction curves, indicated by solid lines, showing operation of the electric motor with one, two, or three motor sections (such as motor sections 215, 217, and 219 of FIG. 2) under peak power generation, and a second set of traction curves, indicated by dashed lines, showing operation of the electric motor with one, two, or three motor sections under continuous power generation. Peak power refers to the amount of power the electric motor may generate at a given speed over a short period of time, e.g. one or two minutes, whereas continuous power refers to the amount of power the electric motor may generate over an indefinite period. The first traction curve, solid line 610, shows peak power as a function of motor speed when the electric motor is operating with three motor sections, the second traction curve, solid line 620, shows peak power as a function of motor speed when the electric motor is operating with two motor sections, and the third traction curve, solid line 630, shows peak power as a function of motor speed when the electric motor is operating with one motor section. Correspondingly, the fourth traction curve, dashed line 640, shows continuous power as a function of motor speed when the electric motor is operating with three motor sections, the fifth traction curve, dashed line 650, shows continuous power as a function of motor speed when the electric motor is operating with two motor sections, and the sixth traction curve, dashed line 660, shows continuous power as a function of motor speed when the electric motor is operating with one motor section. Additionally, example plot 600 contains an inset 670, illustrating the dashed lines 640, 650, and 660 in a high speed regime.

The solid lines 610, 620, 630 each indicate peak power generated by the electric motor with all three motor sections operating, two motor sections operating, and the first motor section operating, respectively. In this example, solid line 610 is greater than solid line 620 over the whole motor speed range, while solid line 620 is greater than solid line 630 over the whole motor speed range. Additionally, each of the solid lines 610-630 show power approximately directly proportional to motor speed, with each changing behavior around the motor speed indicated by speed R1, which is approximately at 50% of the speed capacity of the electric motor. For example, beyond dashed speed R1, the slope in solid line 610 decreases with increased motor speed, corresponding to power generated by the motor with all three motor sections operating at high speeds. Additionally, beyond dashed speed R1, the slope in solid line 620 decreases with increased motor speed, although the decrease in slope with increased motor speed is less than for solid line 610. This may correspond to less degradation of continuous power generation of the electric motor at high speed when operating with two motor sections as compared to the electric motor operating with all three motor sections. Further, beyond dashed speed R1, the slope of solid line 630 remains approximately constant, indicating a lack of degradation of continuous power generation of the electric motor at high speed when operating with a single motor section.

The dashed lines 640, 650, 660 each indicate continuous power generated by the electric motor with all three motor sections operating, two motor sections operating, and the first motor section operating, respectively. As with solid lines 610-630, the amount of continuous power generated in the high speed regime (denoted by inset 670) decreases less as the number of active motor sections is decreased, with dashed line 640 corresponding to all three motor sections active showing the greatest loss of power, decreasing below dashed lines 650, 660 within inset 670, dashed line 650 corresponding to two motor sections active showing less loss of power than dashed line 640, and dashed line 660 corresponding to one motor section active showing less loss of power than dashed lines 640, 650. In this way, dashed lines 640-660 illustrate that, as the number of active motor sections in the high speed regime is decreased, the loss of power in the high speed regime is reduced.

FIG. 7 shows an example plot 700 of a motor efficiency map as a function of torque generated by an electric motor (such as electric motor 200 of FIG. 2) and electric motor speed during operation of the electric motor. The x-axis denotes the speed (RPM) of the electric motor powering the vehicle. In one embodiment of a vehicle (such as vehicle 100 of FIG. 1) in which the vehicle in an all-electric vehicle containing a single gear transmission, the speed of the electric motor may be proportional to the speed of the vehicle. In another embodiment of the vehicle, such as in an all-electric vehicle containing a multi-gear transmission or in a hybrid vehicle, the speed of the vehicle may be a more complicated function of the speed of the electric motor. The y-axis denotes a torque generated by the motor. The motor efficiency map includes continuous regions within the plot corresponding to regions of highest efficiency as a function of torque and speed of the electric motor when operating with one, two or all three stator sections active (such as the first stator section 204, the second stator section 216, and the third stator section 232 of FIG. 2), and one, two or all three rotor sections (such as the first rotor section 212, the second rotor section 224, and the third rotor section 240 of FIG. 2) active, respectively. Additionally, traction curves depicting peak torque generation as a function of speed of the electric motor are depicted for operation of the electric motor with one, two, or all three stator sections active, and one, two or all three rotor sections active, respectively.

The example plot 700 shows a set of traction curves, indicated by solid lines, showing operation of the electric motor with one, two, or three motor sections (such as motor sections 215, 217, and 219 of FIG. 2, respectively) under peak torque generation. Peak torque refers to the amount of torque the electric motor may generate at a given speed over a short period of time, e.g. one or two minutes. The first traction curve 705 shows peak torque as a function of motor speed when the electric motor is operating with three motor sections, the second traction curve 710 shows peak torque as a function of motor speed when the electric motor is operating with two motor sections, and the third traction curve 715 shows peak torque as a function of motor speed when the electric motor is operating with one motor section. Each of the traction curves 705, 710, and 715 are shown for positive and negative peak torque generation, and with the peak torque generation depicted in each of the traction curves 705, 710, and 715 being symmetric about a zero torque axis 720. Additionally, the positive torque portion of the first traction curve 705 may be identical to the first traction curve 510 of FIG. 5, the positive torque portion of the second traction curve 710 may be identical to the second traction curve 520 of FIG. 5, and the positive torque portion of the third traction curve 715 may be identical to the third traction curve 530 of FIG. 5.

Example plot 700 also includes continuous regions in the torque-speed plane that correspond to an optimal efficiency achieved with a corresponding number of motor sections active. In particular, the first region 725 corresponds to a region where highest electric motor efficiency is achieved when all three of the motor sections are being used, the second region 730 corresponds to a region where the highest electric motor efficiency is achieved with two of the motor sections are being used, and the third region 735 corresponds to a region where the highest electric motor efficiency is achieved when exactly one motor section is being used. As with the traction curves 705, 710, and 715, each of the first region 725, the second region 730, and the third region 735 are plotted for values of positive and negative torque generation by the electric motor, with the regions being nearly symmetric along the zero torque axis 720. Additionally, each of the first region 725, the second region 730, and the third region 735 are bounded by the traction curves 705, 710, and 715, respectively. As seen in FIG. 7, in a low speed regime of operation of the electric motor (e.g. the lower half of the speed range depicted in FIG. 7), for a large majority of torque values, it is more efficient to operate in the first region 725 instead of the second region 730 or the third region 735. In the low speed regime of operation, as the speed of the electric motor increases, it becomes more efficient to operate in ether of the second region 730 and the third region 735 over a greater range of torque values. In a high speed regime of operation of the electric motor (e.g. the upper sixth of the speed regime), over approximately the entire available torque range of the high speed regime, it is more efficient to operate in the second region 730 and the third region 735 as compared to the first region 725, illustrating that at high speeds, it is more efficient to operate with less than the total number of motor segments, due to the reduced back EMF generated for operation of the electric motor with less than the total number of motor segments.

As described in the method of FIG. 4, the efficiency map depicted in plot 700 may be used to optimize the number of coupled motor sections for maximum efficiency during vehicle driving. However, optimal driving may also depend on other factors not captured in plot 700, including not switching too rapidly while on the border of two regions. For example, the number of electric motor segment switches per minute while driving with the electric motor may be fixed to be less than a threshold number of switches per minute. Such a threshold number of switches per minute may prevent rapid switching between two regions, e.g. between the first region 725 and the second region 730, which may otherwise degrade the vehicle operator experience. Additionally, in a hybrid electric vehicle, the controller may operate as to minimize fuel consumption.

In this way, by electrically and mechanically decoupling motor sections of an electric motor with multiple motor sections at high speeds, more efficient operation of the electric motor may be achieved. By selectively decoupling motor sections of the electric motor at certain regimes of operation, more continuous performance over the whole speed range of the electric motor may be achieved. The technical effect of electrically and mechanically decoupling motor sections of the electric motor during high speed operation of the electric motor is to reduce field weakening current required to maintain a high speed during operation of the electric motor, thereby reducing motor efficiency losses due to application of the field weakening current. In particular, efficiency of the electric motor may be increased in a high speed, partial load regime, e.g. during constant speed operation of an electric vehicle on the highway.

The disclosure provides support for a system for an electric motor comprising: a plurality of rotor sections configured to be mechanically decoupled from one another, and a plurality of stator sections configured to be electrically decoupled from one another. In a first example of the system, a number of rotor sections of the plurality of rotor sections is equal to a number of stator sections of the plurality of stator sections, wherein each rotor section of the plurality of rotor sections is arranged concentrically within each of a stator section of the plurality of stator sections, each concentric rotor section and stator section pair forming a plurality of motor sections, and wherein a length of each of a motor section of the plurality of motor sections is different. In a second example of the system, optionally including the first example, the plurality of rotor sections includes two or more of a first rotor section, a second rotor section, and a third rotor section, the plurality of rotor sections being arranged coaxially with an output shaft. In a third example of the system, optionally including one or both of the first and second examples, the system further comprises: a first clutch positioned between the first rotor section and the second rotor section configured to mechanically decouple the first rotor section from the second rotor section, and a second clutch positioned between the second rotor section and the third rotor section configured to mechanically decouple the second rotor section from the third rotor section. In a fourth example of the system, optionally including one or more or each of the first through third examples, the plurality of stator sections include two or more of a first stator section including three sets of windings electromagnetically interacting with the first rotor section, with each set of windings of the first stator section carrying a single phase of current, a second stator section including three sets of windings electromagnetically interacting with the second rotor section, with each set of windings of the second stator section carrying a single phase of current, and a third stator section including three sets of windings electromagnetically interacting with the third rotor section, with each set of windings of the third stator section carrying a single phase of current, the plurality of rotor sections and the plurality of stator sections enclosed within a common housing. In a fifth example of the system, optionally including one or more or each of the first through fourth examples, the system further comprises: a first set of switches positioned between the first stator section and the second stator section configured to electrically decouple the first stator section from the second stator section, a second set of switches positioned between the second stator section and the third stator section, and a third set of switches configured to form terminal connections for the third stator section. In a sixth example of the system, optionally including one or more or each of the first through fifth examples, the first set of switches include a first switch coupling a first set of windings of the first stator section to a second set of windings of the first stator section and a second switch coupling the second set of windings of the first stator section to a third set of windings of the first stator section, wherein the second set of switches include a third switch coupling a first set of windings of the second stator section to a second set of windings of the second stator section and a fourth switch coupling the second set of windings of the second stator section to a third set of windings of the second stator section, and wherein the third set of switches include a fifth switch coupling a first set of windings of the third stator section to a second set of windings of the third stator section, and a sixth switch coupling the second set of windings of the third stator section to a third set of windings of the third stator section. In a seventh example of the system, optionally including one or more or each of the first through sixth examples, each of the first set of windings of the first stator section, the first set of windings of the second stator section, and the first set of windings of the third stator section correspond to a first phase of current, wherein each of the second set of windings of the first stator section, the second set of windings of the second stator section, and the second set of windings of the third stator section correspond to a second phase of current, and wherein each of the third set of windings of the first stator section, the third set of windings of the second stator section, and the third set of windings of the third stator section correspond to a third phase of current. In an eighth example of the system, optionally including one or more or each of the first through seventh examples, the system further comprises: a controller including instructions that when executed, cause the controller to: during operation of the electric motor being within a first region of an efficiency map, operate the electric motor with the third rotor section mechanically coupled to each of the first rotor section and the second rotor section by maintaining each of the first clutch and the second clutch coupled, and with the third stator section electrically coupled to each of the first stator section and the second stator section by maintaining each of the fifth switch and the sixth switch closed and all other switches open, the first region of the efficiency map calibrated as a first function of torque and speed of the electric motor. In a ninth example of the system, optionally including one or more or each of the first through eighth examples, the controller includes further instructions to: during operation of the electric motor being within a second region of the efficiency map, mechanically decouple the third rotor section from each of the first rotor section and the second rotor section by decoupling the second clutch, and electrically decouple the third stator section from each of the first stator section and the second stator section by closing each of the third switch and the fourth switch and opening all other switches, the second region of the efficiency map of calibrated as a second function of torque and speed of the electric motor. In a tenth example of the system, optionally including one or more or each of the first through ninth examples, the controller includes further instructions to: during operation of the electric motor being within a third region of the efficiency map, mechanically decouple each of the third rotor section and the second rotor section from the first rotor section by decoupling the first clutch, and electrically decouple each of the third stator section and the second stator section from the first stator section by closing each of the first switch and the second switch and opening all other switches, the third region of the efficiency map calibrated as a third function of torque and speed of the electric motor.

The disclosure also provides support for a method for an electric motor, comprising: during a first condition, operating the electric motor with each rotor section of a plurality of rotor sections mechanically coupled to each other, and each stator section of a plurality of stator sections electrically coupled to each other, and during a second condition, operating the electric motor with at least one rotor section of the plurality of rotor sections mechanically decoupled, via a clutch, from remaining rotor sections of the plurality of rotor sections, and at least one stator section of the plurality of stator sections electrically decoupled, via switches, from remaining stator sections of the plurality of stator sections. In a first example of the method, the first condition is operation of the electric motor being within a first region of an efficiency map, and wherein the second condition is operation of the electric motor within a second region of the efficiency map, the first region of the efficiency map calibrated as a first function of torque and speed of the electric motor, and the second region of the efficiency map calibrated as a second function of torque and speed of the electric motor. In a second example of the method, optionally including the first example, operating the electric motor with at least one rotor section of the plurality of rotor sections mechanically decoupled via the clutch includes opening a second clutch to disconnect a third rotor section of the plurality of rotor sections from a second rotor section of the plurality of rotor sections while maintaining a first clutch joining the second rotor section to a first rotor section of the plurality of rotor sections engaged. In a third example of the method, optionally including one or both of the first and second examples, operating the electric motor with at least one stator section of the plurality of stator sections electrically decoupled via switches from remaining stator sections of the plurality of stator sections includes opening a third set of switches to decouple a plurality of windings of a third stator section of the plurality of stator sections while closing a second set of switches coupling a plurality of windings of a second stator section of the plurality of stator sections. In a fourth example of the method, optionally including one or more or each of the first through third examples, the method further comprises: in response to operation of the electric motor within a third region of the efficiency map, mechanically decoupling each of the second rotor section and the third rotor section from the first rotor section by opening the first clutch, and electrically decoupling each of the second stator section and the third stator section from a first stator section of the plurality of stator sections by opening the second set of switches and closing a first set of switches coupling a plurality of windings of the first stator section, the third region of the efficiency map calibrated as a third function of torque and speed of the electric motor.

The disclosure also provides support for a method for an electric motor with two or more sections, comprising: in response to a transition of operation of the electric motor from one region of an efficiency map to another region of the efficiency map, transitioning from operating the electric motor with each section of the two or more sections active to operating the electric motor with at least one section inactive by first mechanically decoupling the at least one section from remaining sections of one or more sections and then electrically decoupling the at least one section from the remaining sections, the one region of the efficiency map calibrated as one function of speed and torque of the electric motor, and the other region of the efficiency map calibrated as another function of speed and torque of the electric motor. In a first example of the method, operating the electric motor with each section of the two or more sections active includes maintaining each of a first rotor section, a second rotor section, and a third rotor section mechanically coupled to each other via a first clutch and a second clutch, and maintaining each of a first stator section, a second stator section, and a third stator section electrically coupled to each other via electrical connections. In a second example of the method, optionally including the first example, operating the electric motor with the at least one section inactive includes decoupling the second clutch while maintaining the first clutch engaged to mechanically decouple the third rotor section from each of the first rotor section and the second rotor section, and opening each of a third set of switches and a first set of switches while closing a second set of switches to electrically decouple the third stator section from each of the first stator section and the second stator section. In a third example of the method, optionally including one or both of the first and second examples, the first stator section and the first rotor section are coaxial with an output shaft, the first stator section enclosing the first rotor section, wherein the second stator section and the second rotor section are coaxial with the output shaft, the second stator section enclosing the second rotor section, and wherein the third stator section and the third rotor section are coaxial with the output shaft, the third stator section enclosing the third rotor section, each of the first rotor section, the second rotor section, the third rotor section, the first stator section, the second stator section, and the third stator section enclosed within a shared housing.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an electric motor, comprising:
during a first condition, operating the electric motor with each rotor section of a plurality of rotor sections mechanically coupled to each other, and each stator section of a plurality of stator sections electrically coupled to each other; and
during a second condition, operating the electric motor with at least one rotor section of the plurality of rotor sections mechanically decoupled, via a clutch, from remaining rotor sections of the plurality of rotor sections, and at least one stator section of the plurality of stator sections electrically decoupled, via switches, from remaining stator sections of the plurality of stator sections.

2. The method of claim 1, wherein the first condition is operation of the electric motor being within a first region of an efficiency map, and wherein the second condition is operation of the electric motor within a second region of the efficiency map, the first region of the efficiency map calibrated as a first function of torque and speed of the electric motor, and the second region of the efficiency map calibrated as a second function of torque and speed of the electric motor.

3. The method of claim 2, wherein operating the electric motor with at least one rotor section of the plurality of rotor sections mechanically decoupled via the clutch includes opening a second clutch to disconnect a third rotor section of the plurality of rotor sections from a second rotor section of the plurality of rotor sections while maintaining a first clutch joining the second rotor section to a first rotor section of the plurality of rotor sections engaged.

4. The method of claim 3, wherein operating the electric motor with at least one stator section of the plurality of stator sections electrically decoupled via switches from remaining stator sections of the plurality of stator sections includes opening a third set of switches to decouple a plurality of windings of a third stator section of the plurality of stator sections while closing a second set of switches coupling a plurality of windings of a second stator section of the plurality of stator sections.

5. The method of claim 4, further comprising, in response to operation of the electric motor within a third region of the efficiency map, mechanically decoupling each of the second rotor section and the third rotor section from the first rotor section by opening the first clutch, and electrically decoupling each of the second stator section and the third stator section from a first stator section of the plurality of stator sections by opening the second set of switches and closing a first set of switches coupling a plurality of windings of the first stator section, the third region of the efficiency map calibrated as a third function of torque and speed of the electric motor.

6. A method for an electric motor with two or more sections, comprising:
in response to a transition of operation of the electric motor from one region of an efficiency map to another region of the efficiency map,
transitioning from operating the electric motor with each section of the two or more sections active to operating the electric motor with at least one section inactive by first mechanically decoupling the at least one section from remaining sections of one or more sections and then electrically decoupling the at least one section from the remaining sections, the one region of the efficiency map calibrated as one function of speed and torque of the electric motor, and the other region of the efficiency map calibrated as another function of speed and torque of the electric motor.

7. The method of claim 6, wherein operating the electric motor with each section of the two or more sections active includes maintaining each of a first rotor section, a second rotor section, and a third rotor section mechanically coupled to each other via a first clutch and a second clutch, and maintaining each of a first stator section, a second stator section, and a third stator section electrically coupled to each other via electrical connections.

8. The method of claim 7, wherein operating the electric motor with the at least one section inactive includes decoupling the second clutch while maintaining the first clutch engaged to mechanically decouple the third rotor section from each of the first rotor section and the second rotor section, and opening each of a third set of switches and a first set of switches while closing a second set of switches to electrically decouple the third stator section from each of the first stator section and the second stator section.

9. The method of claim 8, wherein the first stator section and the first rotor section are coaxial with an output shaft, the first stator section enclosing the first rotor section; wherein the second stator section and the second rotor section are coaxial with the output shaft, the second stator section enclosing the second rotor section; and wherein the third stator section and the third rotor section are coaxial with the output shaft, the third stator section enclosing the third rotor section, each of the first rotor section, the second rotor section, the third rotor section, the first stator section, the second stator section, and the third stator section enclosed within a shared housing.

* * * * *